United States Patent [19]
Hatae et al.

[11] Patent Number: 6,141,170
[45] Date of Patent: *Oct. 31, 2000

[54] SIGNAL PROCESSING WITH FREQUENCY COMPONENT DETECTION IN TWO MODES

[75] Inventors: Shinichi Hatae, Kawasaki; Takashi Kobayashi, Mitaka; Shinichi Koyama, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/556,655

[22] Filed: Nov. 13, 1995

[30] Foreign Application Priority Data

Nov. 21, 1994 [JP] Japan .................................. 6-286618

[51] Int. Cl.⁷ .................................................. G11B 15/18
[52] U.S. Cl. ............................. 360/72.1; 360/29; 360/31; 360/78.01
[58] Field of Search ............................... 360/40, 41, 72.2, 360/72.1, 72.3, 3.602, 71, 30, 32, 39, 29, 47, 61, 62, 55, 64, 27, 53.31, 73.11, 73.12

[56] References Cited

U.S. PATENT DOCUMENTS

| | | |
|---|---|---|
| 4,979,052 | 12/1990 | Matsuta et al. ...................... 360/40 X |
| 4,984,100 | 1/1991 | Takayama et al. .................... 360/40 X |
| 5,151,699 | 9/1992 | Moryama .............................. 360/40 X |
| 5,157,359 | 10/1992 | Nogami et al. ....................... 360/30 X |
| 5,333,082 | 7/1994 | Kizu ..................................... 360/53 X |
| 5,365,232 | 11/1994 | Ido et al. .............................. 360/40 X |
| 5,432,651 | 7/1995 | Maeno et al. ......................... 360/40 X |
| 5,450,443 | 9/1995 | Siegel et al. .......................... 360/40 X |
| 5,481,414 | 1/1996 | Takada et al. ............................. 360/64 |

*Primary Examiner*—Paul Loomis
*Assistant Examiner*—K. Wong
*Attorney, Agent, or Firm*—Fitzpatrick, Cella, Harper & Scinto

[57] ABSTRACT

There is provided in an embodiment according the present invention, a signal processing device comprising detecting means for detecting a predetermined frequency component of the input signal; modulating means for modulating the input signal and supplying the modulated signal to a recording device; and switching means for supplying, in a first state, the output of the modulating means to the detecting means, and for supplying, in a second state, a reproduced signal to the detecting means from a reproducing device. With the aforementioned construction, the detection circuit that detects a predetermined frequency component included in the modulated digital signal can be used during recording as well as during signal reproduction, which greatly contributes to reducing the size and cost of the recording/reproducing device.

18 Claims, 10 Drawing Sheets

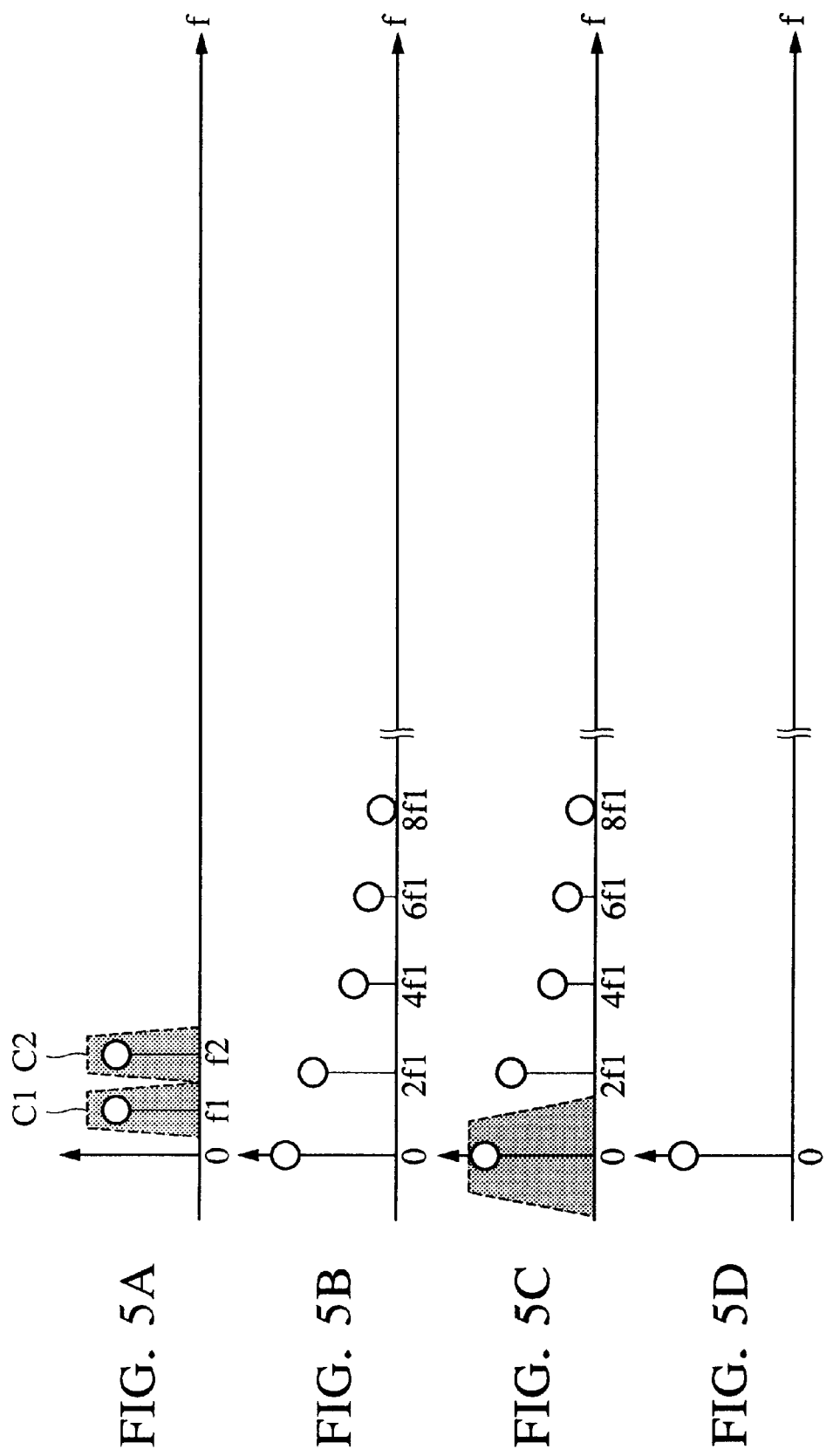

| FIG. 6A | FIG. 6B |

WITHIN ⸬ , ARE RECORDING PILOT MODULATION BLOCKS

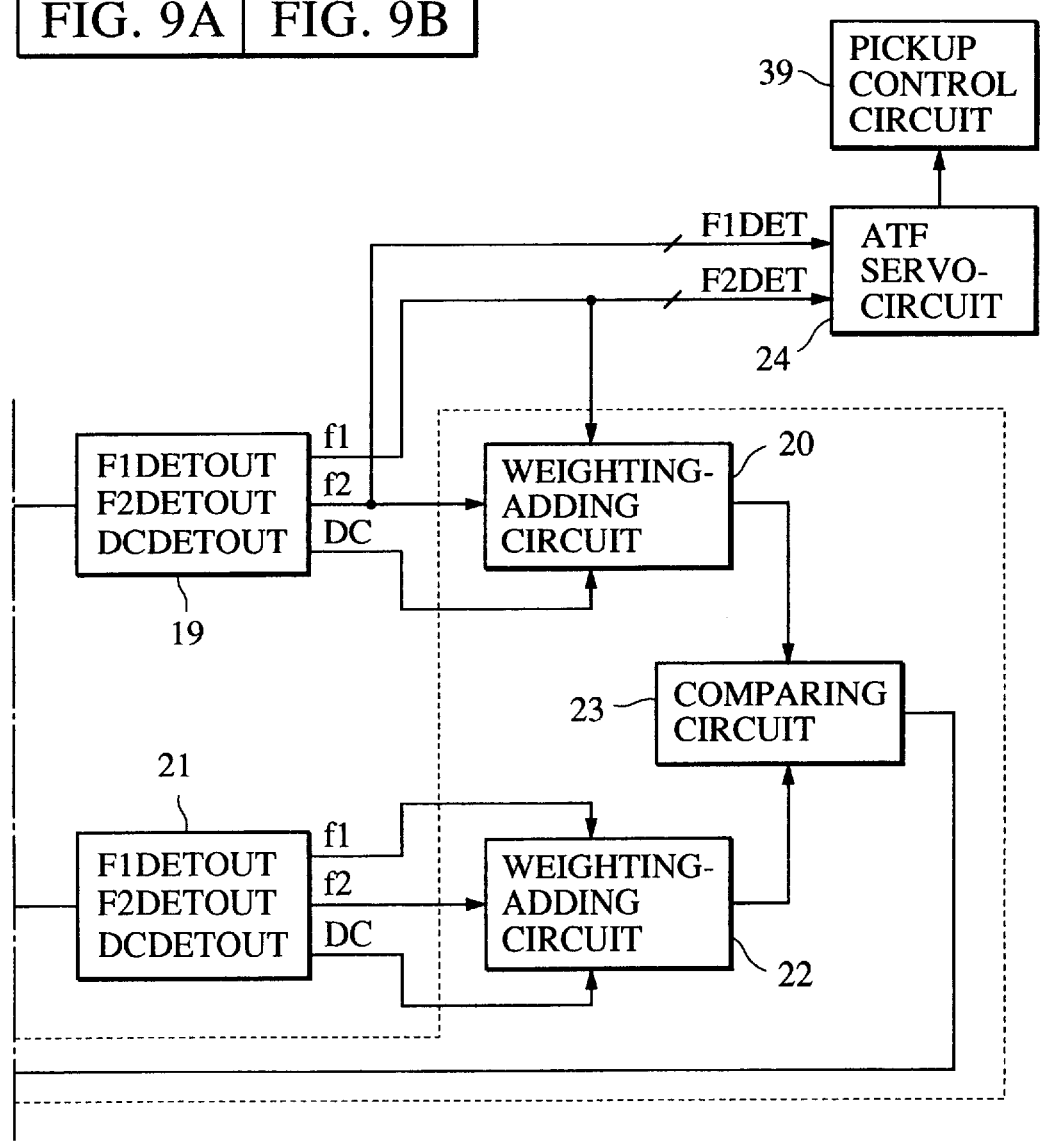

SIGNAL PROCESSING WITH FREQUENCY COMPONENT DETECTION IN TWO MODES

BACKGROUND OF THE INVENTION

1. Field of the Invention

The present invention relates to a signal processing device, and, in particular, to a signal processing device excellent for use in a recording/reproducing apparatus for recording and reproducing a signal at a high density.

2. Description of the Related Art

With the advancement of digital magnetic recording and reproducing technologies in recent years, digital VTRs have been widely developed. Just as in conventional analog VTRs, in digital VTRs, tracking control needs to be carried out during signal reproduction, so that various tracking control techniques have been proposed.

Of these tracking control techniques, the technique which has drawn attention is the one that superimposes a predetermined pilot signal component during modulation of a digital signal data row to be recorded, and employs this pilot signal during signal reproduction to perform tracking control.

FIG. 1 is a schematic view of an arrangement of a recording system of a digital VTR employing this type of technique. In the figure, ch1 and ch2 each denote a rotating head, mounted to a rotating drum at a phase difference of 180 degrees, for recording modulated digital signals onto a magnetic tape which is a recording medium. T denotes a magnetic tape.

A description will now be given of the operation.

A video signal, input from a terminal 101, is supplied to a digital recording signal processing circuit 102 that encodes the video signal with high efficiency, and further performs error correction encoding to form a digital data row in accordance with a recording data format along with audio data and other supplementary data.

This digital data row is supplied to a digital modulating/pilot adding circuit 103 that modulates the digital data row supplied from the processing circuit 102, this digital data row modulation giving redundancy to data, subjected to, for example, 24–25 conversion. The redundancy is utilized to add a pilot signal component.

More specifically, for example, bit values of "1" and a "0" are added to the beginnings of 25-bit data with every 24-bit data, each of which resulting 25-bit data are output as bit streams. These bit streams are each subjected to NRZI modulation. A DC component, an f1 component (first pilot signal frequency), and f2 component (second pilot signal frequency) are extracted from each of the two types of NRZI-modulated bit streams to calculate the total sum of the components of each bit stream. Each total sum is added to a past total sum cumulative value to form a cumulative value for each bit stream. These cumulative values of the two types of bit streams are compared and the 25-bit bit stream making the cumulative value smaller is selected for output. In this case, the bit stream to be output is a bit stream whose DC, f1, and f2 components are suppressed.

Here, when a predetermined pattern signal is superimposed on (for example, subtracted from) each extracted DC component, the aforementioned bit streams possess frequency components with respect to the aforementioned pattern signals. With the frequencies of the predetermined pattern signals set at desired values of f1 and f2, the desired pilot signal frequency components are superimposed onto the modulated digital bit streams.

For example, if the bit rate of each bit stream is defined as fb, the frequency, f1, of the first pilot signal defined as fb/90, and the frequency, f2, of the second pilot signal defined as fb/120, the repeating pattern signal at a 90-bit cycle or a 120-bit cycle is subtracted from each DC component of the two types of bit streams.

The thus-obtained modulated digital bit streams are supplied to a switching circuit 104 as modulated digital recording signals, which are supplied alternately to the rotating heads ch1 and ch2 by a head switching pulse (HSW) formed in accordance with the rotating phase of each rotating head ch1, ch2. The heads ch1 and ch2 rotate at a phase difference of 180 degrees and alternately trace the magnetic tape, T, so as to successively form a large number of helical tracks parallel to one another which are used to record the aforementioned modulated digital recording signals.

FIG. 2 illustrates a recording pattern on the magnetic tape, T. As illustrated in the figure, pilot signals are superimposed on every other track of the large number of helical tracks formed, so that the pilot signal with the frequency of f1 and the pilot signal with the frequency of f2 are alternately superimposed at a 4-track cycle. In the formation of such a recording pattern, for example, the pattern signals having frequencies of f1 and f2 are alternately subtracted from the aforementioned DC component during recording by the head ch1, whereas this is not performed during recording by the head ch2.

FIG. 3 is a block diagram illustrating an arrangement of a conventional reproducing system for reproducing the signal recorded in the format illustrated in FIG. 2.

The modulated signals, alternately reproduced by the heads ch1 and ch2, are input to a head switching circuit 109 via reproduction amplifiers 107 and 108, respectively. The circuit 109 is switched by the HSW generated from a drum rotation detection circuit 115 so as to produce a continuous reproduced signal which is input to a digital signal reproducing processing circuit 110, and an f1 detection circuit 112 and an f2 detection circuit 113. The digital signal reproducing processing circuit 110 operates to perform digital data row modulation, error correction, highly-efficient encoding, etc. to output reproduced information data (video data) to an output terminal 111.

The f1 detection circuit 112 and the f2 detection circuit 113, each containing, for example, an analog bandpass filter, extract pilot signal components that are supplied to a tracking control circuit 116. After detection of the level of the aforementioned detection circuits 112 and 113, the tracking control circuit 116 takes the difference between the detected level outputs. If tracking control is performed such that the head ch2 reproduces a self-recording track, the head ch2 traces a track that does not have a pilot signal superimposed thereon, which means that the f1 and f2 components are obtained from both adjacent tracks, respectively. Here, the difference between the pilot signal components can be used to obtain a signal that indicates tracking error of the head ch2. It is to be noted that since a tracking error signal cannot be obtained during tracing by the head ch1, the tracking control circuit 116 samples and holds the tracking error signal obtained just before the tracing. Since a tracking error signal reverses in polarity every 2-track cycles, the tracking control circuit synchronizes with the HSW to appropriately reverse the sign of the aforementioned difference value.

The thus-obtained tracking control signals are supplied to a capstan control circuit 117. The transportation of the magnetic tape T is controlled so that the heads trace the desired tracks.

A description will now be given of an analog detection circuit employed as f1 detection circuit and f2 detection circuit, with reference to FIGS. 4 and 5. FIG. 4 illustrates a construction of a conventional common analog detection circuit, wherein an analog signal to be detected is input to an input terminal 121. FIG. 5A illustrates a spectrum of the analog signal input to the input terminal 121.

For simplification, FIG. 5A characteristically illustrates the pilot signal components alone. Although not particularly illustrated, it is obvious that the spectrum of each modulated digital bit stream is also superimposed.

The input signal is supplied to a bandpass filter (BPF) 122 that extracts only the f1(f2) component. In FIG. 5A, c1 and c2 represent the characteristics of the BPF to extract the f1 and f2 components, respectively. In the following description, a circuit that extracts the f1 component is taken as an example. The BPF 122 extracts the f1 component alone in accordance with the aforementioned characteristic c1, and inputs the f1 component to an absolute value detection circuit (ABS) 123.

FIG. 5B illustrates a spectrum distribution of the output signal of the ABS 123. As illustrated in the figure, a high harmonic signal, having a frequency an even number of times greater than the f1 frequency, is developed. Accordingly, if the output signal from the ABS 123 remains in the form of an absolute value, the high harmonic component remains. Therefore, this high harmonic component is removed by a lowpass filter (LPF) having such a characteristic, indicated by C3 of FIG. 5, as to extract only the DC component as illustrated in FIG. 5D. It is obvious that the circuit for extracting the f2 component is constructed in the same way.

As is apparent from the foregoing description, at the recording side circuit of such a conventional digital VTR, the 25-bit data with a leading bit value of "1" and that with a starting bit value of "0" each require circuits that extract from the bit stream, during digital processing, a DC component, an f1 component, and an f2 component, respectively, as well as a cumulative value calculating circuit. In addition, circuits are required for extracting an f1 component and an f2 component, respectively, by analog processing, during reproduction.

Accordingly, in such a VTR, a digital signal processing section and an analog signal processing section must be provided for tracking control alone, which results in a larger number of hardware components. More specifically, a large space is required for accommodating a special analog circuit which must be externally attached in the digital VTR constructed mostly of digital processing circuits. In addition, it is necessary to provide a lowpass filter to remove the high harmonic component, developed by the detection circuit disposed behind the bandpass filter, thereby making it difficult to achieve an efficient circuit arrangement.

SUMMARY OF THE INVENTION

Accordingly, an object of the present invention is to make it possible to overcome the aforementioned problems.

Another object of the present invention is to provide a signal processing device for use in a digital VTR or the like, which makes it possible to minimize the circuit size.

To achieve the aforementioned objects, there is provided in an embodiment according the present invention, a signal processing device comprising detecting means for detecting a predetermined frequency component of the input signal; modulating means for modulating the input signal and supplying the modulated signal to a recording device; and switching means for supplying, in a first state, the output of the modulating means to the detecting means, and for supplying, in a second state, a reproduced signal to the detecting means from a reproducing device.

With the aforementioned construction, the detection circuit that detects a predetermined frequency component included in the modulated digital signal can be used during recording as well as during signal reproduction, which greatly contributes to reducing the size and cost of the recording/reproducing device.

Other objects and features of the present invention will become more apparent from the following detailed description of preferred embodiments with reference to the drawings.

BRIEF DESCRIPTION OF THE DRAWINGS

FIG. 5 illustrates frequency characteristics used for describing the operation of the detection circuit of FIG. 4.

DETAILED DESCRIPTION OF PREFERRED EMBODIMENTS

A description will be given of only an example of the various embodiments of the present invention with reference to the attached drawings.

Figure 2:
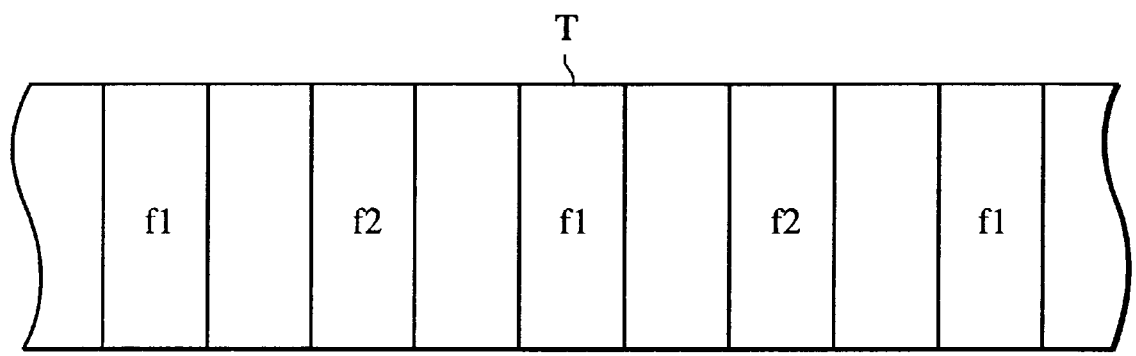
FIG. 2 illustrates a recording pattern on a magnetic tape recorded by the digital VTR of FIG. 1.
Figure 4:
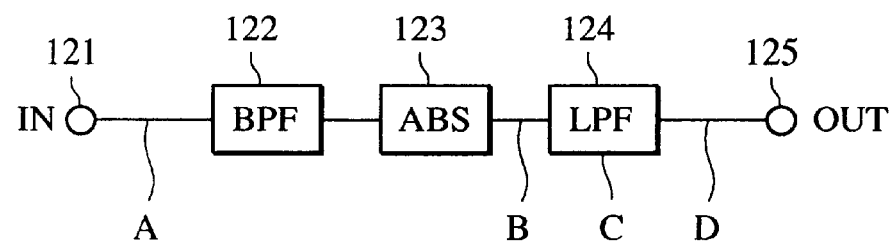
FIG. 4 is a block diagram illustrating a construction of a common analog detection circuit.
Figure 3:
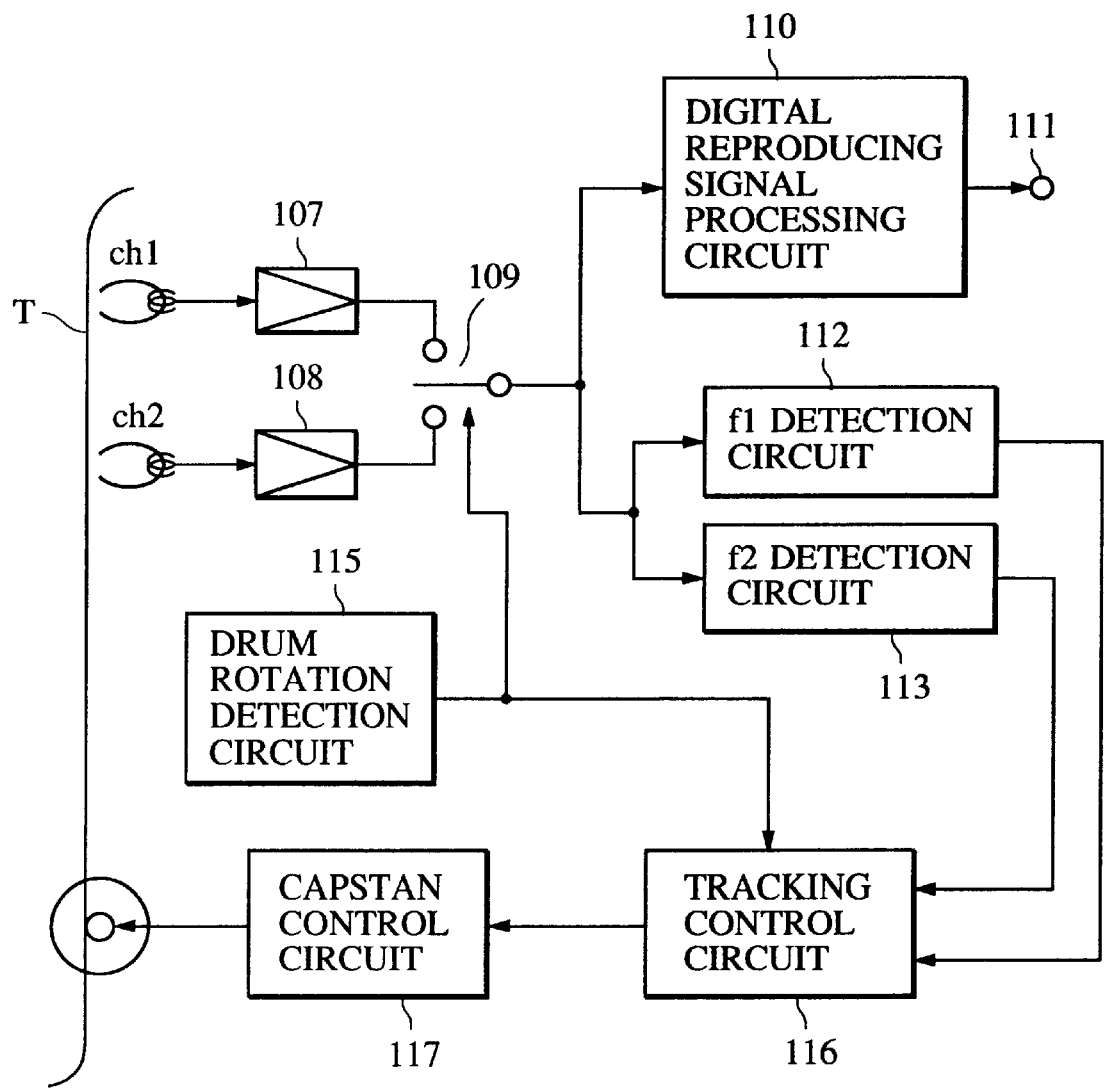
FIG. 3 is a block diagram illustrating an arrangement of a reproducing system of a digital VTR for reproducing the recording pattern of FIG. 2.
Figure 6A:
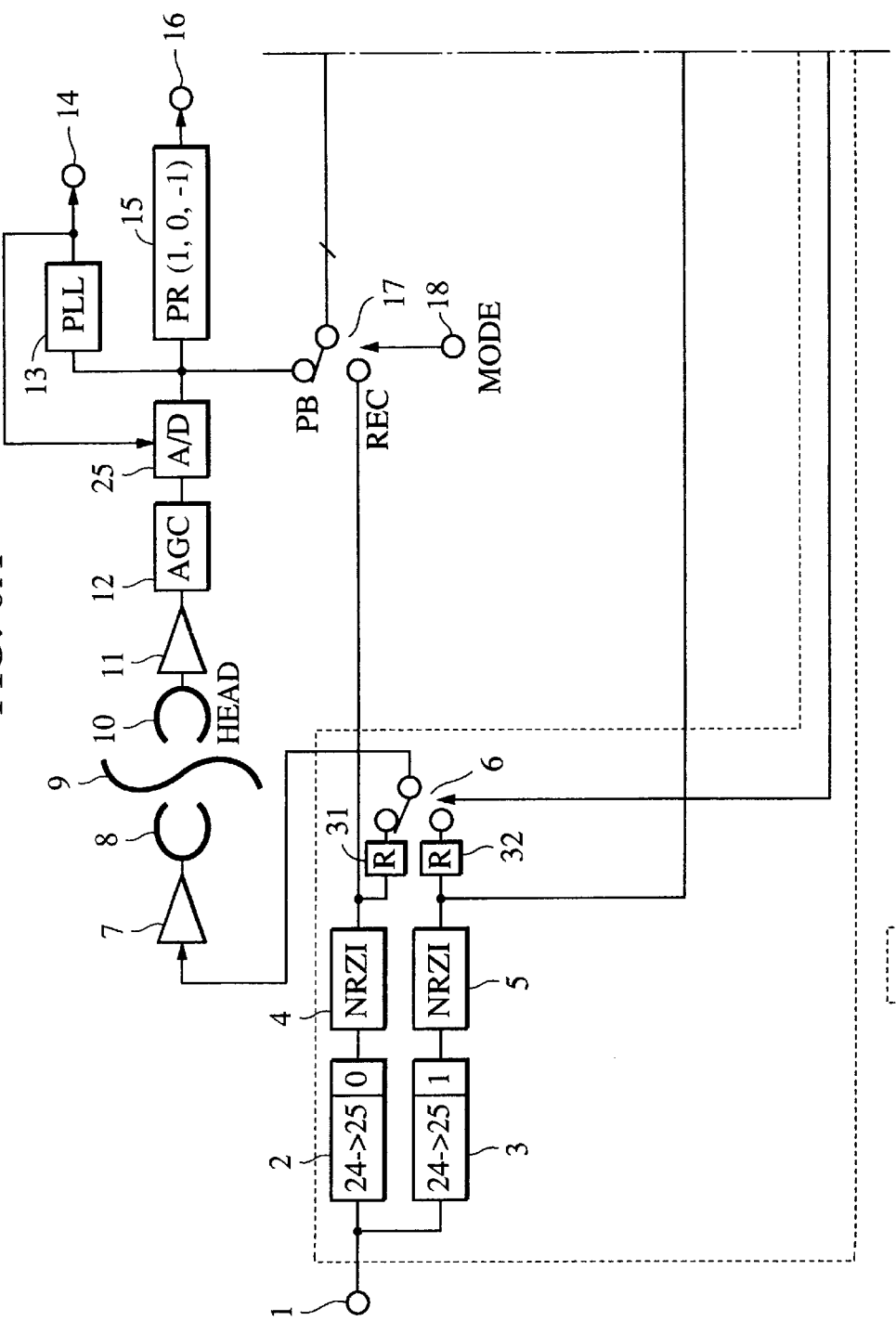
FIG. 6 is a block diagram of an arrangement of the entire digital VTR in an embodiment in accordance with the present invention.
Figures 6, 6B:
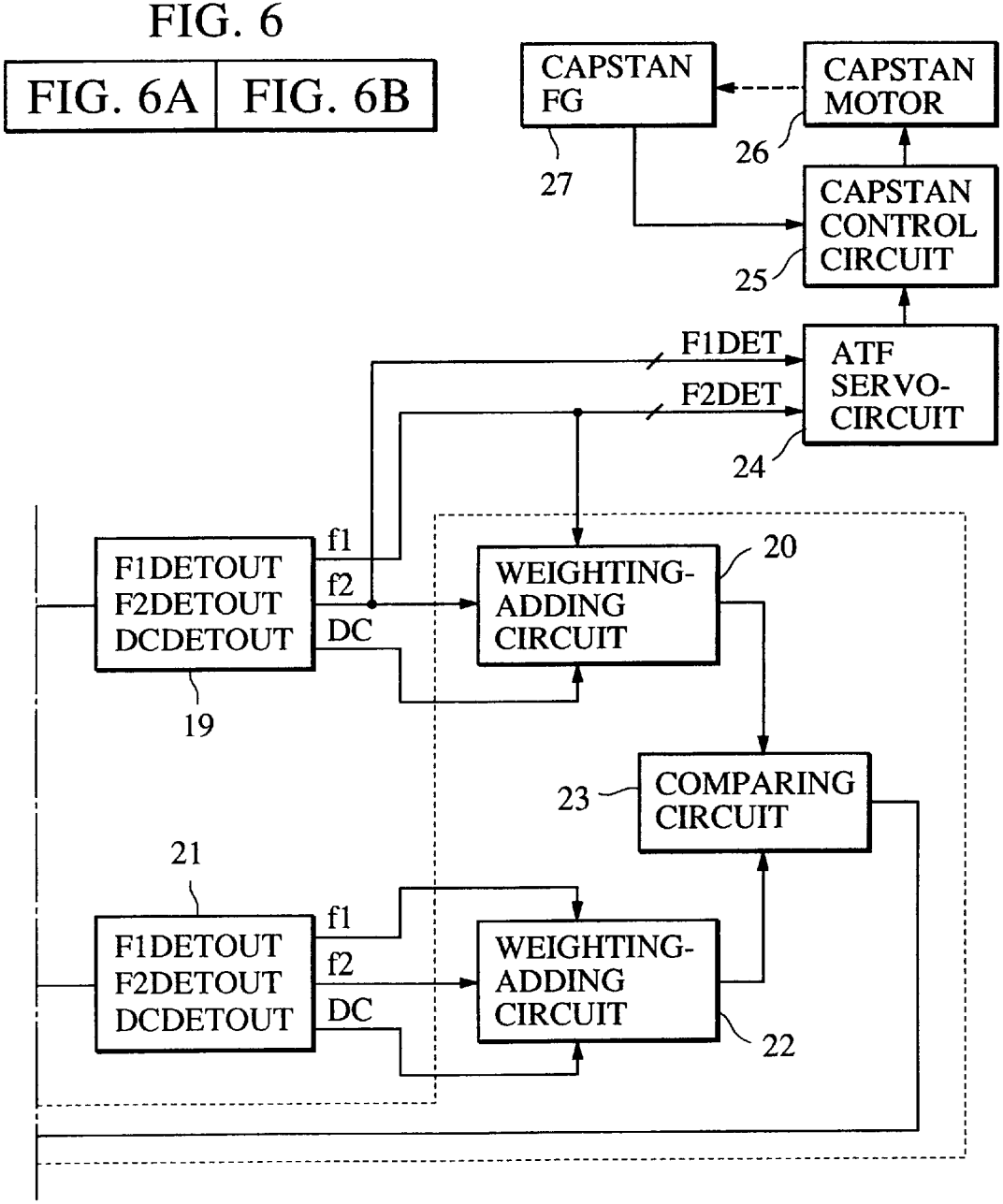

FIG. 6 is a schematic view of an arrangement of a digital VTR in an embodiment of the present invention. In the embodiment, pilot signals, illustrated in FIG. 2, are recorded, and the pilot signals, recorded in such a form, are used to perform tracking control.

A description will first be given of the operation during recording. During recording, the digital video signal, input to an input terminal 1, is supplied to 24/25 converting circuits 2 and 3, and a one bit signal value "1" or "0" is added to each 24-bit data. The bit streams, output from the 24/25 converting circuits 2 and 3, are input to NRZI modulating circuits 4 and 5, respectively, and subjected to interleaved NRZI modulation to execute an exclusive logical "AND" with the signal that precedes by two bits.

After the periods of the bit streams from the modulating circuits 4 and 5 are delayed by an amount corresponding to 25 bits by 25-bit registers 31 and 32, the bit streams are input to a change-over switch 6. During the delay period, as will be described later, the 25-bit data are analyzed, of which one is selectively output by means of an output signal from a comparing circuit 23. The data, output to the change-over switch 6, is supplied to a rotating head 8 via a recording amplifier 7 and recorded on a tape 9. Here, a large number of tracks are formed in parallel on the tape 9 as illustrated in FIG. 6.

The output signal from the modulating circuit 4 is supplied to a mode change-over switch 17. The mode change-over switch 17 is connected to REC side during recording in accordance with a mode specifying signal input from a system control microcomputer (not illustrated) to a terminal 18. Accordingly, the bit stream, output from the NRZI modulating circuit 4, is directly supplied to a pilot detection circuit 19. On the other hand, the bit stream, output from the NRZI modulating circuit 5, is input to a pilot detection circuit 21.

The pilot detection circuits 19 and 21 each detect the f1 component, the f2 component, and the DC component from the bit streams input thereto. Then, each of the circuits output information indicating the amplitudes (energies) of these components. In FIG. 6, F1DETOUT, F2DETOUT, and DCDETOUT output the detection results of the f1 component, f2 component, and DC component, respectively.

The three detection output results from the pilot detection circuit 19 and the three detection output results from the pilot detection circuit 21 are input respectively to adding circuits 20 and 22 where each of the components are subjected to weight-adding computation. The outputs of the adding circuits 20 and 22 are compared by the comparing circuit 23 which outputs the comparison result whereby the aforementioned switch 6 is controlled.

For example, to suppress any one of the components, f1, f2, or DC, or, more specifically, to perform operations when there are tracks, illustrated in FIG. 6, that do not have pilot signals superposed thereon, the adding circuits 20 and 22 each add the output results from the F1DETOUT, F2DETOUT, and DCDETOUT in a 1:1:1 ratio. The output of the comparing circuit 23 is determined such that the output of the modulating circuit at the side of either adding circuit 20 or 22 with the smaller output is supplied from the switch 6. When the f1 component is to be superposed onto the modulated signal, the adding circuits 20 and 22 each add F1DETOUT, F2DETOUT, and DCDETOUT in a—1:1:1 ratio. The output from the comparing circuit 23 is, in the same way, determined so that the output of the modulating circuit at the side of either of the adding circuits 20 or 22 with the smaller output is supplied from the switch 6. When the f2 component is to be superposed onto the modulated signal, the adding circuits 20 and 22 each add F1DETOUT, F2DETOUT, and DCDETOUT in a 1:−1:1 ratio. The output of the comparing circuit 23 is, in the same way, determined so that the output of the modulating circuit at the side of either the adding circuits 20 or 22 with the smaller output is supplied from the switch 6.

In this way, the desired pilot signal component can be appropriately superposed onto the desired track. A description will now be given of the operation during signal reproduction.

During reproduction, the RF signal, reproduced by a reproducing rotating head 10 from the tape 9, is amplified by a reproduction amplifier 11, and the amplified signal is input to an AGC circuit 12. The AGC circuit 12 controls the reproduced RF signal such that it has a constant amplitude, and the controlled reproduced RF signal is then input to an A/D converter 25.

The reproduced RF bit stream, quantized by the A/D converter, is input to a PLL circuit 13 to directly detect a phase component from the quantized RF bit stream so as to generate a clock pulse in synchronization with this phase. This clock pulse is fed back to the A/D converter 25, and functions as another digital circuit system clock pulse to remove a jitter component produced by an electromagnetic converting system.

On the other hand, the reproduced RF bit stream from the A/D converter 25 is input to a PR or partial response (1, 0,−1) post coder 15 that processes the bit stream. The processed bit stream is supplied to a following digital signal processing circuit via a terminal 16. Thereafter, at the digital signal processing circuit, the bit stream is subjected to Viterbi decoding, expanded, and corrected, to restore the original video signal.

The reproduced RF bit stream from the A/D converter 25 is supplied to a switch 17. This switch 17 is, as described above, controlled by a mode signal generated from the system control microcomputer, which causes it to be connected to PB during reproduction. This means that the reproduced RF bit stream is input to the detection circuit 19 that has been used during recording.

The f1 component (F1DET) and the f2 component (F2DET), extracted from the reproduced RF bit stream, are supplied to an ATF servo-circuit 24 that takes the difference between the f1 and f2 components. As described above, the signal (ATF error signal) indicating a tracking error is obtained from the difference taken at the time the reproducing rotating head 10 is reproducing a track of FIG. 6 that does not have a pilot signal superposed thereon. Therefore, while the reproducing rotating head 10 is reproducing a track of FIG. 6 having superposed thereon a pilot signal, the ATF error signal obtained during reproduction of the immediately preceding track is sampled and held. The polarity of the ATF error signal reverses in a 2-track cycle, so that the circuit 24 synchronizes with HSW obtained from drum rotating phase detecting means (not shown) to appropriately reverse the sign of the aforementioned difference.

The ATF error signal, obtained in this way from the ATF servo-circuit 24, is supplied as digital data to a capstan control circuit 25. The capstan control circuit 25 detects the period of a signal (capstan FG) having a frequency in accordance with a rotating speed of the capstan generated from a capstan FG 27 to form a capstan speed control signal which is combined with the aforementioned ATF error signal at a proper ratio to obtain a capstan control signal.

A description will now be given of a specific construction of the aforementioned detection circuits 19 and 21 with reference to FIG. 7.

Figure 7:
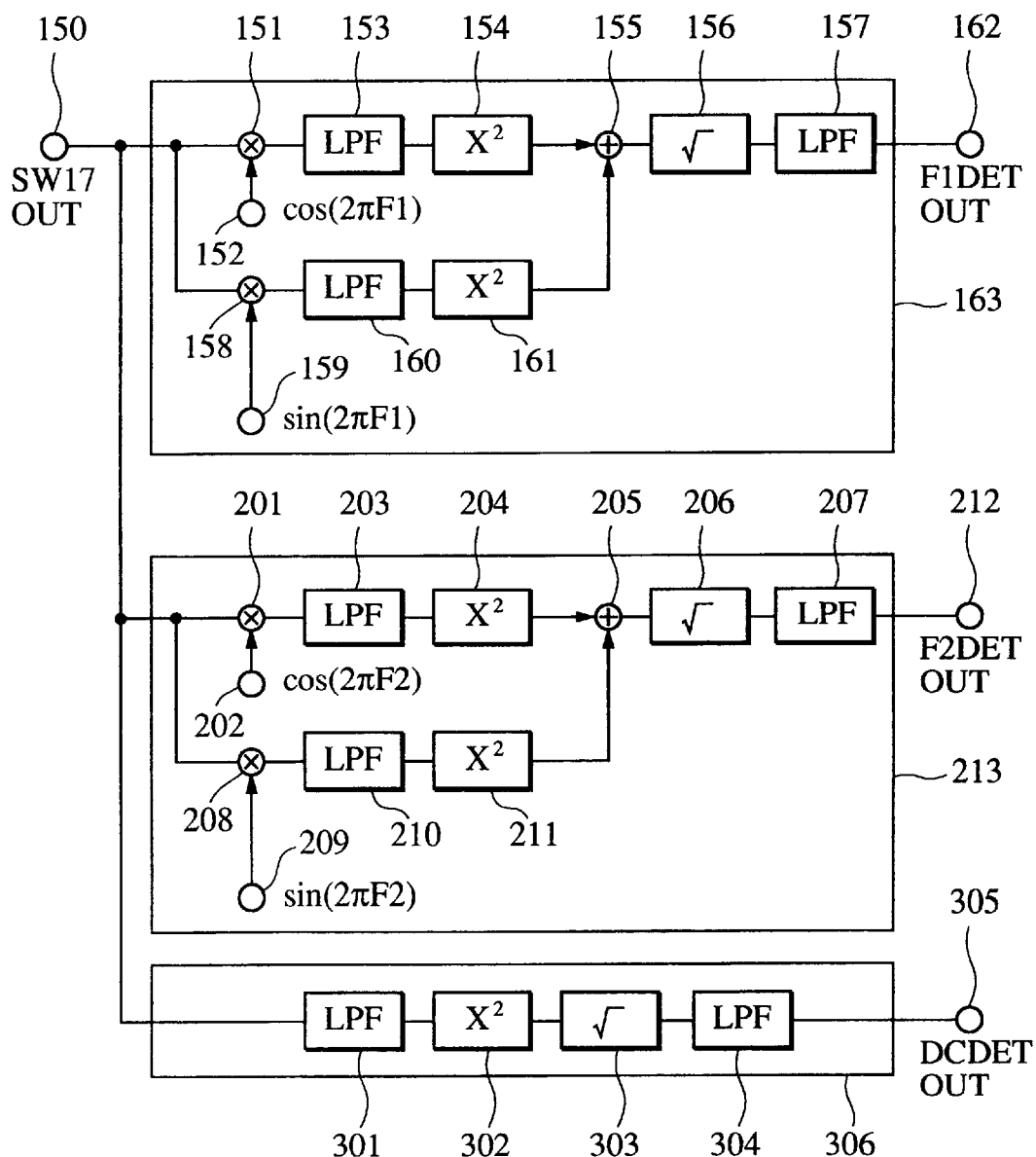
FIG. 7 is a block diagram illustrating an arrangement of the detection circuit of FIG. 6.

Referring to FIG. 7, reference numeral 150 denotes an input terminal to which is input a bit stream from the switch 17. The input bit stream is then input to an f1 detection circuit 163, an f2 detection circuit 213, and a DC detection circuit 306.

In the f1 detection circuit 163, the input bit stream is first input to multipliers 151 and 152. The terminal 152 has input thereto a cosine wave signal with a frequency of f1, while the terminal 159 has input thereto a sine wave signal with a frequency of f2. These signals are multiplied to the bit stream input to the terminal 150.

The outputs of the multipliers 151 and 158, that is the signals produced by multiplication of the bit stream and the two types of signals that are perpendicular to each other, are supplied, respectively, to LPF 153 and 160, after which unnecessary high-harmonic components that are close to the DC component are removed. The output signals of the LPF 153 and 160 are input, respectively, to squaring units 154 and 161, both of which take out the outputs of the LPF 153 and 160 as absolute values, which are input to an adder 155.

The output of the adder 155, that is the vector data obtained by separating the input bit stream into perpendicular components and adding them, is input to a square root computing unit 156. The output of the square root computing unit 156 is further input to an LPF 157 to remove unnecessary components that are not close to the DC component. It is to be noted that the amount of f1 component can be detected even without the square root computing unit and the LPF 157. Accordingly, only the f1 component is extracted from the detected bit stream data by the phase difference detection, followed by output of the f1 detected signal (F1DET) from an output terminal 162.

In the f2 detection circuit 213, reference numerals 201 and 203 denote multipliers; reference numerals 202 and 204 denote input terminals for a sine wave signal and a cosine wave signal, respectively; reference numerals 203 and 211 denote squaring units; reference numeral 205 denotes an adder; reference numeral 206 denotes a square root computing unit; and reference numeral 207 denotes an LPF. The f2 detection circuit 213 operates in almost the same way as the f1 detection circuit 163, wherein in the final analysis only the f2 component is extracted from the bit stream data detected by phase difference detection operation, followed by output of the f2 detection signal (F2DET) from an output terminal 212. The only difference between it and the aforementioned f1 detection circuit 163 is that the frequencies of the sine wave signal and the cosine wave signal to be multiplied by the multipliers 201 and 203 are f2 instead of f1.

Although sine wave signals and cosine wave signals have been used as input signals to the terminals 152 and 159 of the f2 detection circuit 163, and the terminals 202 and 209 of the f2 detection circuit 213, any signals which are perpendicular to each other and are of the same frequency may be used, including rectangular waves, trapezoidal waves, and triangular waves. When sine waves and cosine waves are used, however, their high-harmonic components affect their respective DC components, which must be prevented from affecting the spectrum component to be output. This is done, for example, by increasing the sampling frequency or forming a filter with suitable characteristics.

A description will now be given of a DC detection circuit 306. The bit stream, input from the terminal 150, is input to an LPF 301, followed by separation of the frequency components not close to the DC component. The output of the LPF 301 is squared by a squaring circuit 301, after which the square root of the resultant output is computed by a square-root computing unit 303. The output of the square-root computing unit 303 is input to an LPF 304, and unnecessary components not close to the DC component are removed. The output of the LPF 304 is output to a terminal 305 as DC detection output.

The output of each of the thus-detected components f1, f2 and DC are, as described above, employed for selecting the modulated signal during recording as well as for tracking control during signal reproduction.

Figure 8:
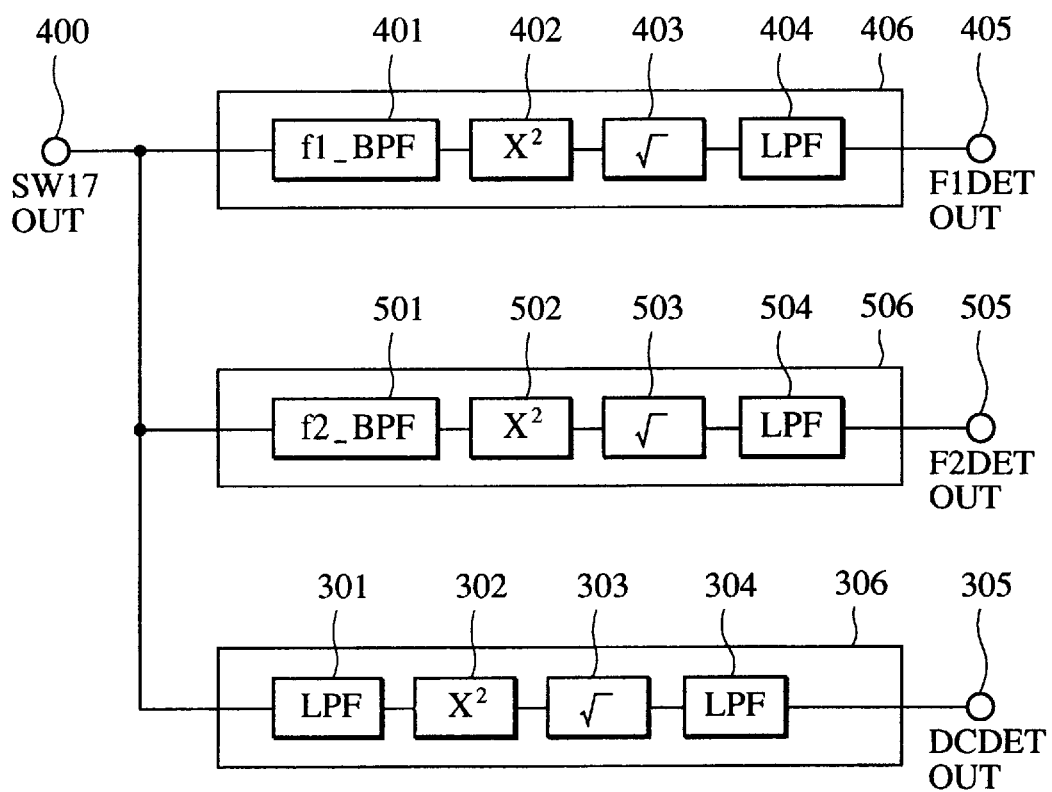
FIG. 8 is a block diagram illustrating another arrangement of the detection circuit of FIG. 6.

FIG. 8 illustrates another specific construction of the detection circuits 19 and 21 of FIG. 6. Referring to FIG. 8, reference numeral 400 denotes an input terminal to which is input a bit stream from the switch 17. The input bit stream is input to an f1 detection circuit 406, an f2 detection circuit 506, and a DC detection circuit 306.

A description will first be given of the f1 detection circuit 406. The bit stream, input from the terminal 400, is input to an f1-BPF 401, and the frequency components not close to f1 in value are removed. The output of the f1-BPF401 is squared by a squaring circuit 402, followed by computation of the square root thereof by a square root computing unit 403. The output of the square root computing 403 is input to an LPF 404, and the unnecessary components not close to the DC component are removed. The resultant bit stream, output from the LPF 404, is output from a terminal 405 as f1 detection value.

The construction of f2 detection circuit 506 is similar to that of the f1 detection circuit 406. Reference numeral 501 denotes f2-BPF for removing frequency components not close to f2 in value; reference numeral 502 denotes a squaring circuit; reference numeral 503 denotes a square root computing unit; reference numeral 504 denotes an LPF; and reference numeral 505 denotes a terminal from which an f2 detection output is obtained. A detailed description of DC detection circuit 306 will be omitted since this circuit is exactly the same as that of FIG. 7.

Figure 1:
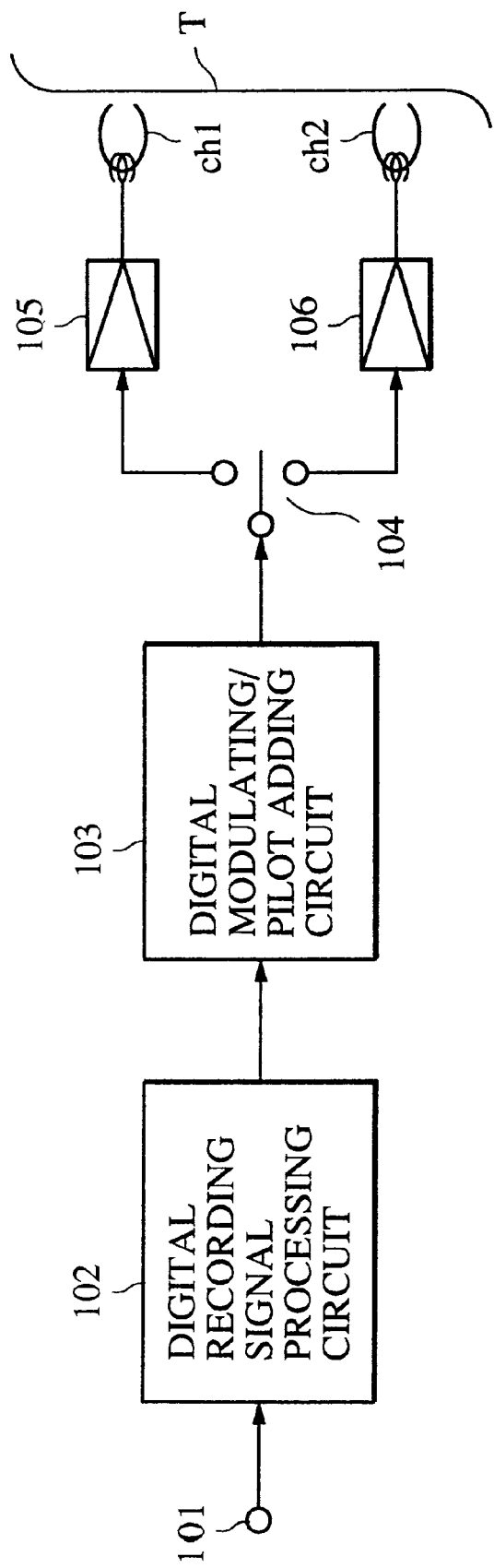
FIG. 1 is a block diagram of an arrangement of a recording system of a common digital VTR.
Figure 9A:
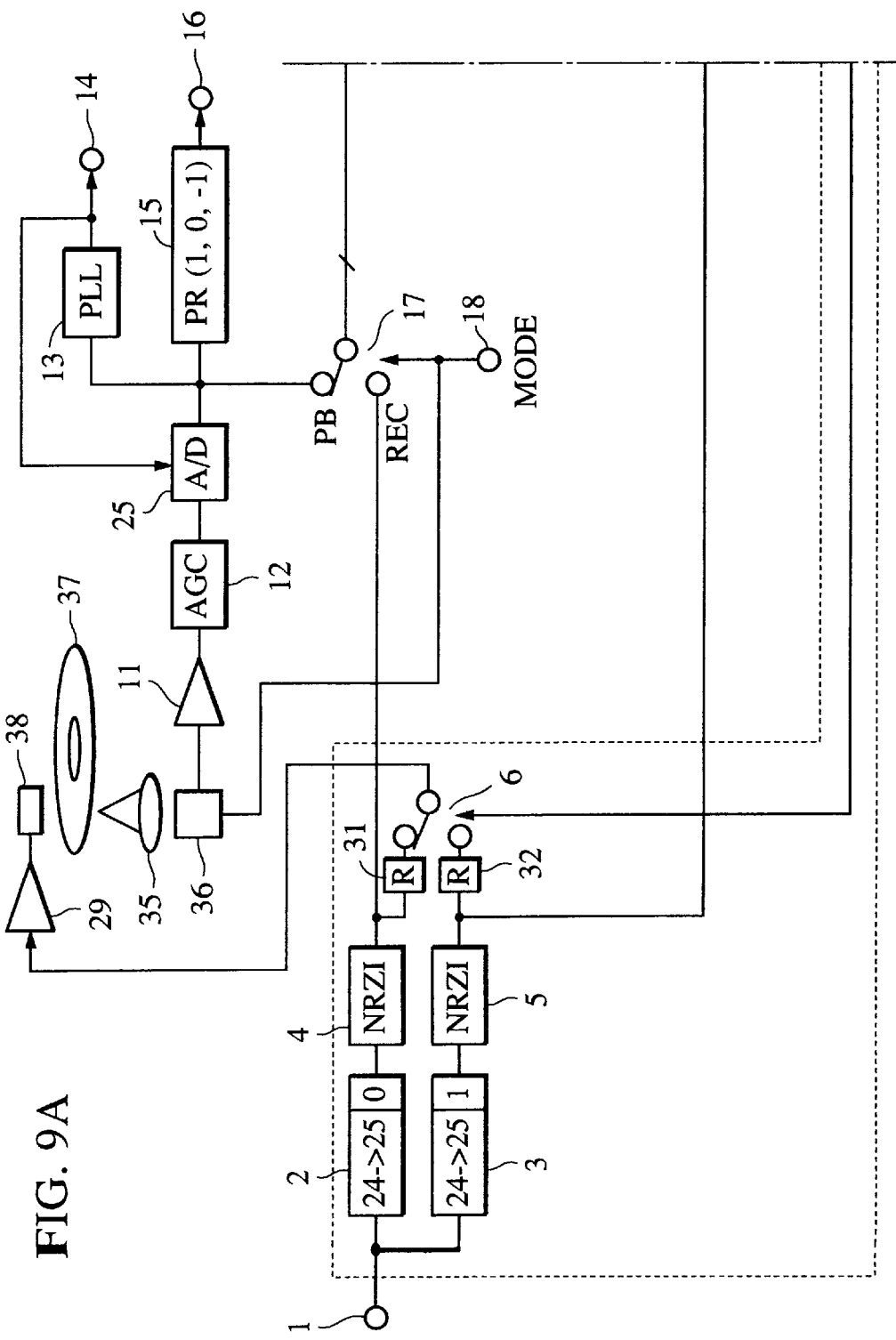
FIG. 9 is a block diagram illustrating an arrangement of the entire optical disk recording/reproducing device in another embodiment of the present invention.

A description will now be made of another embodiment of the present invention with reference to FIG. 9. In FIG. 9, the same or similar component parts as those of FIG. 1 will be given the same reference numerals, so that a detailed description thereof will be omitted.

In this embodiment, the present invention is applied to a magneto-optic recording/reproducing device. Referring to FIG. 9, the bit stream, output from a switch 6, is supplied to a magnetic head recording amplifier 29, and then supplied to an optical disk 37 by a magnetic head 38. Here, in recording mode, in accordance with a mode switching signal from a terminal 18, a laser transmission/pickup device 36 illuminates the magneto-optic recording surface via a lens 35 with laser beam set such that its temperature rises to a Curie temperature. Accordingly, magnetizing effects of an S polarity or N polarity that correspond to bit value of "1", "0" of the digital bit stream remain on the disk 37.

As in the device of FIG. 6, when the output of the comparing circuit 23 is utilized and the 25-bit bit stream output from the switch 6 is selected, superposition of the desired frequency components, such as f1 and f2, may or may not be carried out, so as to effect alternate superposition of f1 and f2 on every other track on the optical disk 37.

During reproduction, the laser transmission/pickup device 36 illuminates the magneto-optic recording surface via the lens 35 with a weak laser beam whose temperature will not rise to the Curie temperature, and the so-called Kerr effect is utilized which is a phenomenon in which the direction of reflection of the laser beam rotates in the direction of magnetic recording, so as to guide the reproduction signal in accordance with the reflected light detected as a result of pickup operation by the device 36. This reproduced signal is supplied to the reproduction amplifier 11 and then supplied to a reproduction circuit following the AGC circuit 12.

In the device of FIG. 9, it is possible to detect the reproduced digital bit stream by the detection circuit 19 to obtain an ATF error signal. The ATF error signal is supplied from the ATF servo-circuit 24 to a pickup control circuit 39 to control the optical pickup position, which results in tracking control.

Obviously the present invention can be applied to other devices such as a recording/reproducing device employing a magnetic disk, although a VTR employing a magnetic tape and a device employing an optical disk alone have been specifically mentioned in the foregoing description.

As will be understood from the foregoing description, according to the above-described recording/reproducing device, during recording, the output signal of the modulating means is supplied to the detecting means that detects the predetermined frequency components, and, during reproduction, switch means is employed for supplying the reproduced signal to the detecting means. Therefore, it is possible to accurately detect the pilot signal component included in the modulated digital signal without using an analog circuit as well as to commonly use this detection circuit at the recording side and reproducing side, thus reducing the circuit size of the entire device.

What is claimed is:

1. A signal processing device, comprising:

detecting means for detecting predetermined frequency components of a supplied signal;

modulating means for modulating an input signal inputted thereto to generate a plurality of modulated signals;

switching means for, in a first state, supplying one of the modulated signals generated by said modulating means to said detecting means so that the predetermined frequency components included in the modulated signal are detected by said detecting means, and, for supplying in a second state, a reproduced signal reproduced by a reproducing device from a recording medium to said detecting means so that the predetermined frequency components included in the reproduced signal are detected by said detecting means;

modulation control means for controlling said modulating means based on an output of said detecting means in the first state, to cause one of the plurality of modulated signals to be selected for being supplied to a recording device for recording the modulated signal on the recording medium; and tracking control means for controlling the position of the recording medium relative to the reproducing device based on an output of said detecting means in the second state.

2. A device according to claim 1, wherein the input signal comprises a digital signal, composed of a predetermined bit, and said modulating means adds a redundancy bit to the digital signal and modulates the digital signal to which the redundancy bit has been added in conformity with a predetermined rule.

3. A device according to claim 2, wherein said modulating means performs NRZI modulation on the digital signal to which the redundancy bit has been added.

4. A device according to claim 3, wherein said modulating means takes out every other bit of the digital signal to which the redundancy bit has been added, and determines the next bit to be taken out in accordance with the taken-out data.

5. A device according to claim 2, wherein said modulation control means determines the redundancy bit utilizing the output of said detecting means.

6. A device according to claim 1, wherein said recording device records a signal upon formation of a plurality of tracks parallel to one another on a recording medium, wherein said modulation control means controls said modulation means such that a pilot signal having predetermined frequency component is superposed on the plurality of modulated signals.

7. A device according to claim 6, wherein said modulation control means controls said modulating means such that two pilot signals having different frequency components are alternately superposed on signals recorded on every other track.

8. A device according to claim 7, wherein said tracking control means compares the two pilot signals detected by said detecting means and controls the position of said recording medium relative to said reproducing device in accordance with the result of comparison.

9. A device according to claim 1, wherein said detecting means includes a plurality of multiplying means for multiplying a plurality of signals with a predetermined frequency and different phases with the supplied signal supplied to said detecting means, and adding means for adding the plurality of signal components extracted from the output of said plurality of multiplying means.

10. A device according to claim 1, wherein said detecting means includes a bandpass filter for separating said predetermined frequency components.

11. A device according to claim 1, wherein said detecting means detects said predetermined frequency components of the supplied signal by digital signal processing.

12. A signal processing method, comprising:

a modulating step for modulating an input signal to generate a plurality of modulated signals;

a first detecting step for detecting predetermined frequency components included in one of the plurality of modulated signals outputted in said modulating step;

a first control step for controlling the modulating step based on the predetermined components detected in said first detecting step to cause one of the plurality of modulated signals to be selected for being supplied to a recording device for recording the modulated signal on a recording medium;

a second detecting step for detecting the predetermined frequency components included in a reproduced signal reproduced by a reproducing device from the recording medium; and a second control step for controlling the position of the recording medium relative to the reproducing device based on the predetermined frequency components detected in said second detecting step;

wherein a common detection circuit is used in both said first and second detecting steps.

13. A method according to claim 12, wherein the input signal comprises a digital signal composed of a predetermined bit, and wherein said modulating step includes a step for adding a redundancy bit to the digital signal and a step for modulating the digital signal to which the redundancy bit has been added in accordance with a predetermined rule.

14. A method according to claim 13, wherein said modulating step includes a step for performing NRZI modulation on the digital signal to which the redundancy bit has added.

15. A method according to claim 13, wherein said first control step includes a step for determining the redundancy bit by using the predetermined frequency components detected in said first detecting step.

16. A method according to claim 13, wherein said first control step includes a step for determining the redundancy bit such that a pilot signal having a predetermined frequency is superposed on the modulated signal.

17. A signal processing device, comprising:

detecting means for detecting predetermined frequency components of a supplied signal;

modulating means for modulating an input signal inputted thereto to generate a plurality of modulated signals;

recording means for recording one of the modulated signals outputted from said modulating means on a recording medium;

reproducing means for reproducing signals from said recording medium;

switching means for supplying one of the modulated signals generated by said modulating means to said detecting means so that the predetermined frequency components included in the modulated signal are detected by said detecting means while said recording means operates, and for supplying a reproduced signal reproduced by said reproducing means to said detecting means so that the predetermined frequency components included in the reproduced signal are detected by said detecting means while said reproducing means operates;

modulation control means for controlling an operation of said modulating means based on an output of said detecting means while said recording means operates to cause one of the plurality of modulated signals to be selected for being supplied to the recording means for recording the selected one of the modulated signals on the recording medium; and tracking control means for controlling the position of the recording medium relative to said reproducing device based on an output of said detecting means while said reproducing means operates.

18. A device according to claim 17, wherein a plurality of tracks are formed in parallel on the recording medium, two pilot signals of different frequencies having been superposed on signals recorded on every other track, and wherein said tracking control means compares the two types of pilot signals detected by said detecting means and controls the position of said recording medium relative to said reproducing means in accordance with the result of comparison.

* * * * *

UNITED STATES PATENT AND TRADEMARK OFFICE
CERTIFICATE OF CORRECTION

PATENT NO. : 6,141,170

DATED : October 31, 2000

INVENTOR(S): SHINICHI HATAE, ET AL.

It is certified that error appears in the above-identified patent and that said Letters Patent is hereby corrected as shown below:

COLUMN 1:
Line 49, "and" should read --and an--.

COLUMN 10:
Line 33, "step;" should read --step,--.
Line 43, "added." should read --been added.--.

Signed and Sealed this

Twenty-ninth Day of May, 2001

Attest:

NICHOLAS P. GODICI

Attesting Officer     Acting Director of the United States Patent and Trademark Office